(12) United States Patent
Fay

(10) Patent No.: US 9,830,948 B1
(45) Date of Patent: Nov. 28, 2017

(54) AUTOMATED INTELLIGENT VISUALIZATION OF DATA THROUGH TEXT AND GRAPHICS

(71) Applicant: Todor Fay, La Jolla, CA (US)

(72) Inventor: Todor Fay, La Jolla, CA (US)

(73) Assignee: NEWBLUE INC., San Diego, CA (US)

( * ) Notice: Subject to any disclaimer, the term of this patent is extended or adjusted under 35 U.S.C. 154(b) by 0 days.

(21) Appl. No.: 15/441,160

(22) Filed: Feb. 23, 2017

Related U.S. Application Data

(63) Continuation of application No. 15/216,397, filed on Jul. 21, 2016, now Pat. No. 9,620,173.

(51) Int. Cl.
| | |
|---|---|
| *H04N 5/93* | (2006.01) |
| *G11B 27/036* | (2006.01) |
| *H04N 21/262* | (2011.01) |
| *H04N 21/25* | (2011.01) |
| *H04N 21/854* | (2011.01) |
| *H04N 21/81* | (2011.01) |
| *H04N 21/234* | (2011.01) |

(52) U.S. Cl.
CPC ..... *G11B 27/036* (2013.01); *H04N 21/23406* (2013.01); *H04N 21/251* (2013.01); *H04N 21/26258* (2013.01); *H04N 21/8133* (2013.01); *H04N 21/854* (2013.01)

(58) Field of Classification Search
None
See application file for complete search history.

(56) References Cited

U.S. PATENT DOCUMENTS

| | | | | |
|---|---|---|---|---|
| 2008/0244416 A1* | 10/2008 | Dumant | .................... | G06F 8/38 715/744 |
| 2010/0023863 A1* | 1/2010 | Cohen-Martin | ....... | G06Q 30/02 715/723 |
| 2012/0284625 A1* | 11/2012 | Kalish | .................. | G11B 27/034 715/723 |
| 2014/0328570 A1* | 11/2014 | Cheng | .................... | G11B 27/10 386/241 |
| 2016/0353172 A1* | 12/2016 | Miller | .................. | G06F 3/0482 |

* cited by examiner

*Primary Examiner* — Heather Jones
(74) *Attorney, Agent, or Firm* — Ronaldo Penaflor

(57) ABSTRACT

Embodiments of the invention relate to an automated, intelligent visualization of data through text and graphics for connecting a wide range of data sources to graphics visualization software and automating its presentation, including building on a standard template driven system for generating graphics from data. Some of these building mechanisms include: Service Handlers, which are plugin components with their own process for converting the data into something uniform, Input Behaviors, which define actions and data to deliver from a service, a system for matching templates to input behaviors by the set of variables in each and the rules for matching them, a Schedule Request mechanism, which connects the data from the service, via the input behavior mechanism, to the correct titles, and handles the assignment of data and then conducts the appropriate actions, and the use of handler defined queues for managing the order of things in parallel.

9 Claims, 16 Drawing Sheets

US 9,830,948 B1

AUTOMATED INTELLIGENT VISUALIZATION OF DATA THROUGH TEXT AND GRAPHICS

RELATED APPLICATIONS

This application claims the benefit of priority of U.S. Provisional Application Ser. No. 62/323,392 filed Apr. 15, 2016 and Non-Provisional application Ser. No. 15/216,397 filed Jul. 21, 2016, which are hereby incorporated by reference in its entirety.

FIELD OF THE INVENTION

The present invention relates generally to graphical data management systems and more specifically it relates to an automated, intelligent visualization of data through text and graphics for connecting a wide range of data sources to graphics visualization software and automating its presentation.

BACKGROUND

Traditionally, broadcasting has been an activity that involves highly skilled specialists utilizing expensive equipment to send live video over a limited number of network channels. An important component of this process has been the real time display of information as text and graphics layered over the video. Examples range from sports scoreboards to stock tickers to weather. Systems to accomplish this have traditionally been highly specialized, complicated to run, and expensive.

Now, broadcasting has expanded exponentially to the point where anybody can originate a broadcast on a personal computer and send it over the Internet. As the cost and complexity of broadcasting shrinks, so too must the cost and complexity of the graphics systems that retrieve data and automate its conversion into text and graphics overlaying a live broadcast. Indeed, with the graphics hardware provided for consumer games today, the underlying firepower to do this affordably already exists.

And indeed, products like NewBlue's Titler Live realize the power of delivering complex text and graphics on today's low cost computers. But, there still remains the task of automating the management of graphics data coming in to drive the titles.

Three examples of this growing need are Twitch streamers, who broadcast a video game live while displaying dynamic user information on screen, and high school sportscasters, who stream an athletic event over the Internet and require a live overlaid scoreboard.

For the online gamer, the need is for a system that connects to multiple game related services, for example Twitch and StreamTip, retrieves real time data, organizes the data intelligently, and displays it over the streamed game with quality animations, fueling an interactive and entertaining live broadcast. This must be easily set up by the gamer who chooses and even customizes the title templates, while making high level decisions about when and how to display them.

For a high school sportscaster, game data from a scoreboard or similar source needs to be processed, and played back automatically with broadcast style graphics, simplifying the streaming experience and making the whole process approachable and affordable.

SUMMARY

The invention generally relates to a graphical data management system which includes a Service, Service Handler, Scheduler, Template Library, Template Finder, Play List, Editor, Render Engine, and Playback Engine.

There has thus been outlined, rather broadly, some of the features of the invention in order that the detailed description thereof may be better understood, and in order that the present contribution to the art may be better appreciated. There are additional features and practical applications and use of the invention and components thereof that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an automated, intelligent visualization of data through text and graphics for connecting a wide range of data sources to graphics visualization software and automating its presentation.

Another object is to provide a graphical data management system for connecting one or more services to a visualization software engine and automating its presentation on a video output device for playback, a method including the one or more services generating data input; the visualization software engine receiving the data input from the one or more services, wherein the visualization software engine comprises a service handler, a scheduler, a play list, a render engine, and a playback engine; the service handler processing the data input and translating the data input into a set of actions and variables; the play list having a set of titles; the scheduler, upon receiving the set of actions and variables from the service handler, delivering the variables to the set of titles in the play list, setting a rendering action with the render engine, and triggering a playback action to the playback engine; and the render engine rendering a video output defined by a plurality of templates and the set of actions and variables, wherein the video output includes one or more suitable formats supported by the video output device for playback.

Another object is to provide a mechanism that empowers a user to easily select a data service, quickly find a template that works with it, customize if desired, and set it to automatically run.

Another object is to provide a mechanism that offers a uniform way to automatically connect disparate data services to pre-built templates.

Another object is to provide a mechanism that automates playback in a way that is appropriate for the data being visualized and consistent with user expectations without requiring configuration or programming on the user's part.

Another object is to provide a mechanism that organizes the scheduling of automated graphics in a temporally cohesive way.

Another object is to provide a mechanism that provides automated graphics with an option for easy user curation.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
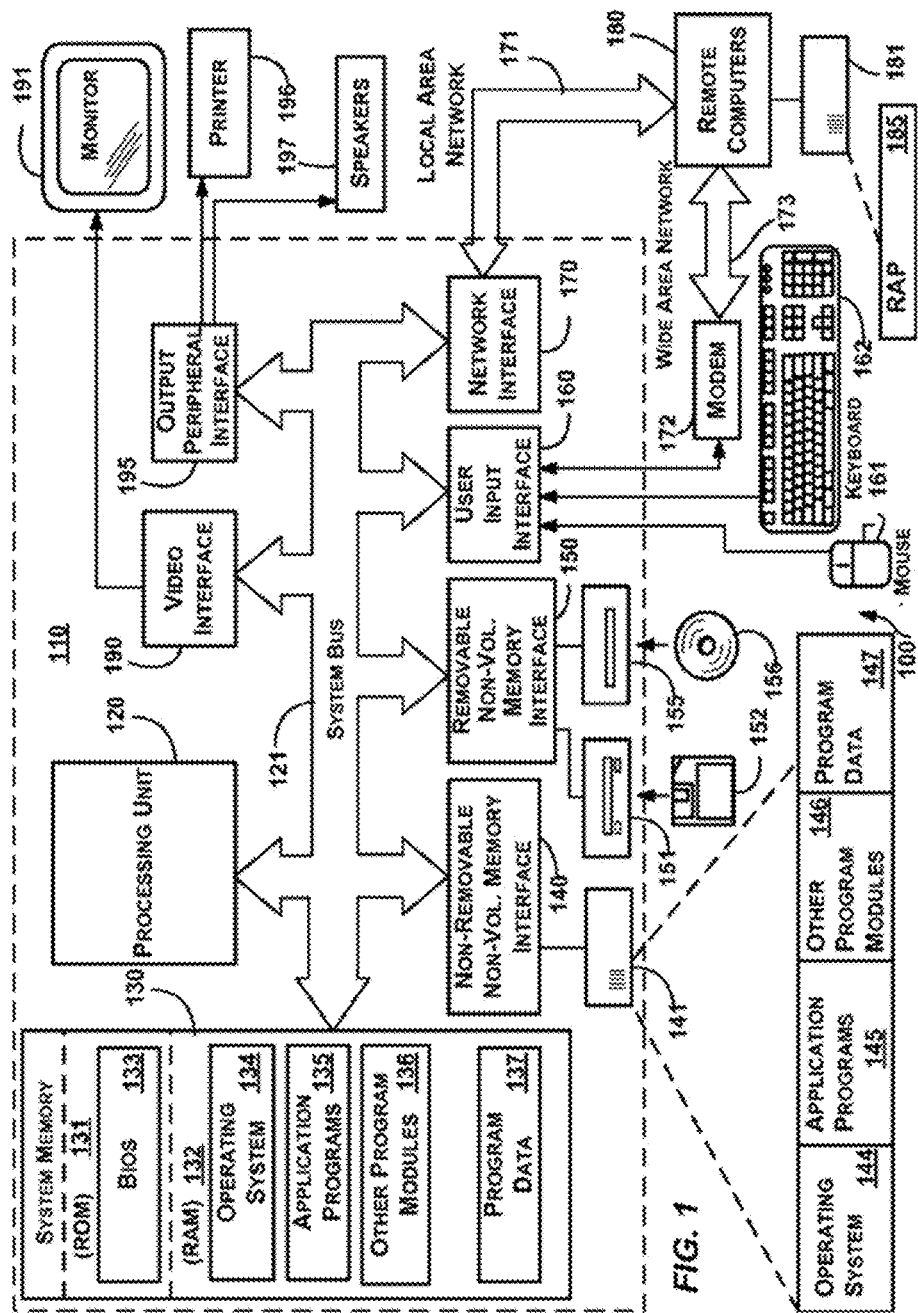
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

The computing environment 100 may include a system board 110 (alternatively known as the mainboard, motherboard, baseboard, planar board or logic board) which implemented on a printed circuit board (PCB). It provides communication between many of the electronic components of the system operating components, such as a central processing unit (CPU) and memory, and provides connectors for other peripherals. Hardware elements related to the system board 110 include, for example, memory components defined by a system memory using Read Only Memory ROM 131 and Random Access Memory RAM 132 circuitry, a central processing unit CPU 120 being defined by a microprocessing circuit, a system bus 121 having physical wiring bus elements to transfer binary data between each hardware components, and multiple external interfaces including a video interface 190, an output peripheral interface 195, non-removable and removable memory interfaces (140, 150), a user input interface 160, and a network interface 170. External hardware components of the system board 110 may include a display monitor 191, printer 196, speakers 197, keyboard 162, a pointing device or mouse 161, and a local area network 171 interfacing to remote computers 180. Software, programs data, and firmware may be applied to and installed on the system memories (131, 132) and provide instructions to operate the computing system 100. A BIOS 133 for providing a set of computer instructions in firmware that control input and output operations of the computer system 100 may be installed in the ROM 131. Applications related software include an operating system OS 134, applications programs 135, other program software modules and drivers 136, and program data 137. Software may also be loaded and operated via storage devices such as hard drive 141, disk drive 151 via disk 152, and compact disk drive 155 via compact disk CD 156. The storage device may include and execute software such as an operating system 144, application programs 145, other program modules 146, and program data 147.

Aspects of the subject matter described herein are operational with numerous other general purpose or special purpose computing system environments or configurations.

Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants PDAs, gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

The computing system environment 100 may also have or may execute a variety of operating systems OS, including an operating system used on a desktop platform or a mobile operating system used mobile devices such as smartphones, cellular/mobile phone, tablets, personal digital assistance PDA, laptop computer, smart watches, and the like. The computing system environment 100 may also include or may execute a variety of possible applications or "Apps", such as music streamers/players, e-book readers, utility Apps, and electronic gaming apps. The application may provide connectivity and communication with other devices or a server over a network, such as communicating with another computer via a wired or wireless Internet or Intranet network for online interaction such as electronic gaming or online collaboration.

Aspects and features of this invention include several benefits to current broadcasting systems by providing efficient and increased performance of retrieving and handling real-time information from disparate data services and automating its conversion into text, graphics, and audio overlay on a live broadcast.

A. Overview

Figure 2:
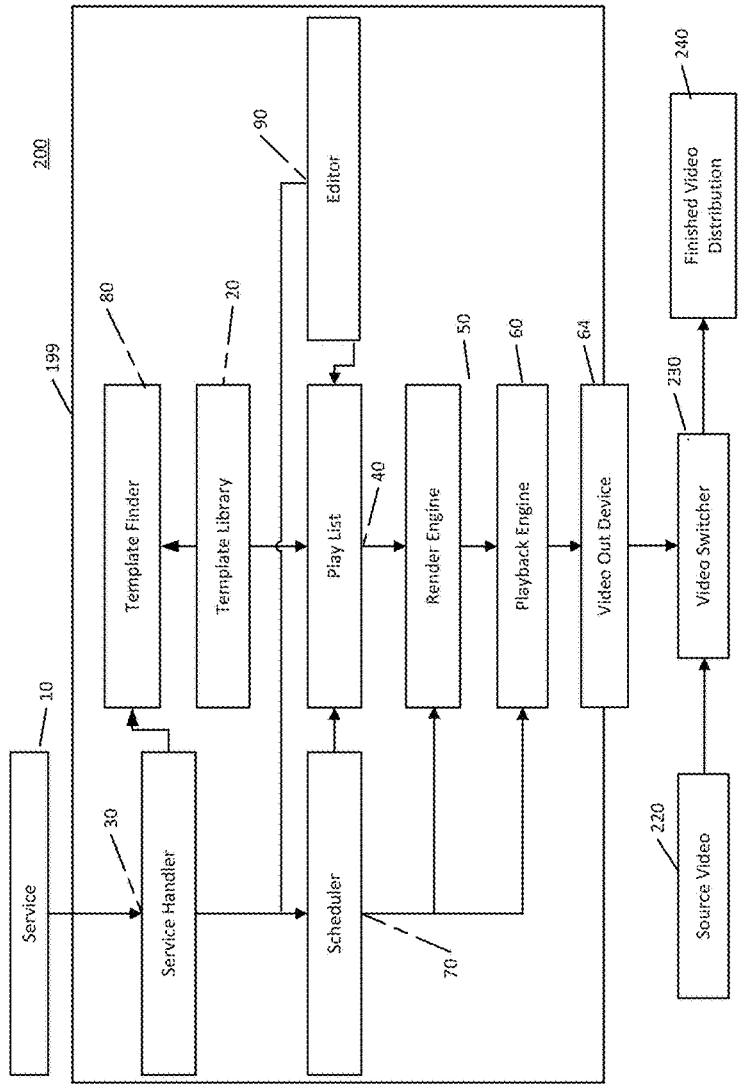
FIG. 2 is a block diagram illustrating the overall components of the present invention, including a Service, a Service Handler, a Template Finder, a Template Library, a Scheduler, a Play List, an Editor, a Render Engine, a Playback Engine, a Video Out Device, a Source Video, a Video Switcher, and a Final Video Distribution.

Turning now descriptively to the remaining drawings, in which similar reference characters denote similar elements throughout the several views, the figures illustrate components of a graphical data management system 200. In FIG. 2, the graphical data management system 200 is represented by three general components: a Service 10, an intelligent graphics visualization software engine 199 and several external output components. In practice, these external output components may include, for example, a Video Out Device 64, a Source Video 220, a Video Switcher 230, and a Final Video Distribution 240. Sub-components included within the visualization software engine 199 may include a Service Handler 30, a Scheduler 70, a Template Library 20, a Template Finder 80, a Play List 40, an Editor 90, a Render Engine 50 and Playback Engine 60.

B. Service

In the graphical data management system 200 shown in FIG. 2, a Service 10 is defined in this document as anything that generates data to drive the graphics of the system 200. For example, Services 10 range from hardware devices to Internet APIs application program interfaces to even the user interface that allows the user to type in what to play and when.

As illustrated in FIG. 2, each Service 10 may include an external data source from external hardware or software-based devices that can generate useful data to visualize in the invention. In some hardware implementations, the external data sources may include, for example, scoreboards, video scoreboards, electronic measurement devices, sound and timing systems. The intelligent visualization software engine 199 may be coupled and configured to receive a one or more services of external data sources from Service 10.

Figure 3:
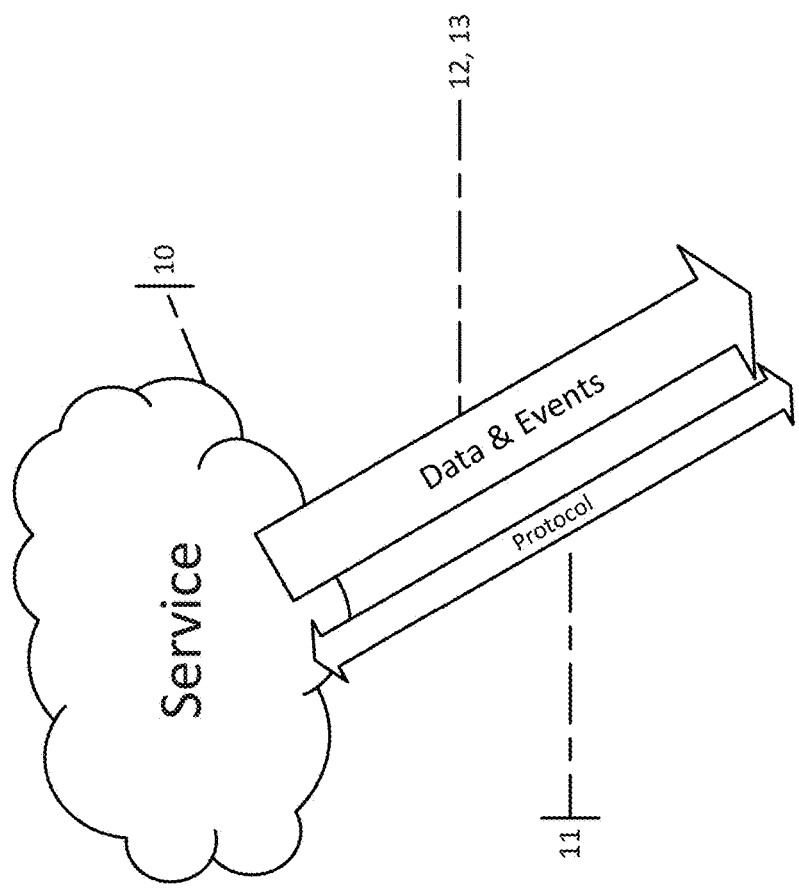
FIG. 3 is a block diagram illustrating a sub-component of the present invention, including an example of the Service which provides Data and Events per its communication protocol.

As shown in FIG. 3, each Service 10 may have its own pre-defined Protocol 11, the mechanism for communicating with the Service. Some of these protocols include, for example, communicating with a hardware scoreboard device over a TCP Socket Connection, reading a temperature sensor over a USB cable, or parsing game donation data from a cloud server in JSON format. This can be any combination of hardware and software to send Data 12 as well as Events 13, specific moments in time that signal when data arrives or changes. For example, a time service sends the current time as Data and the very moment when the hour or minute changes as an Event.

The range of technologies that can be used to create services is without limit. Anything that can produce useful data can be a Service as long as there is a means to connect it to the system and a protocol for receiving data from it.

C. Template Library

Figure 4:
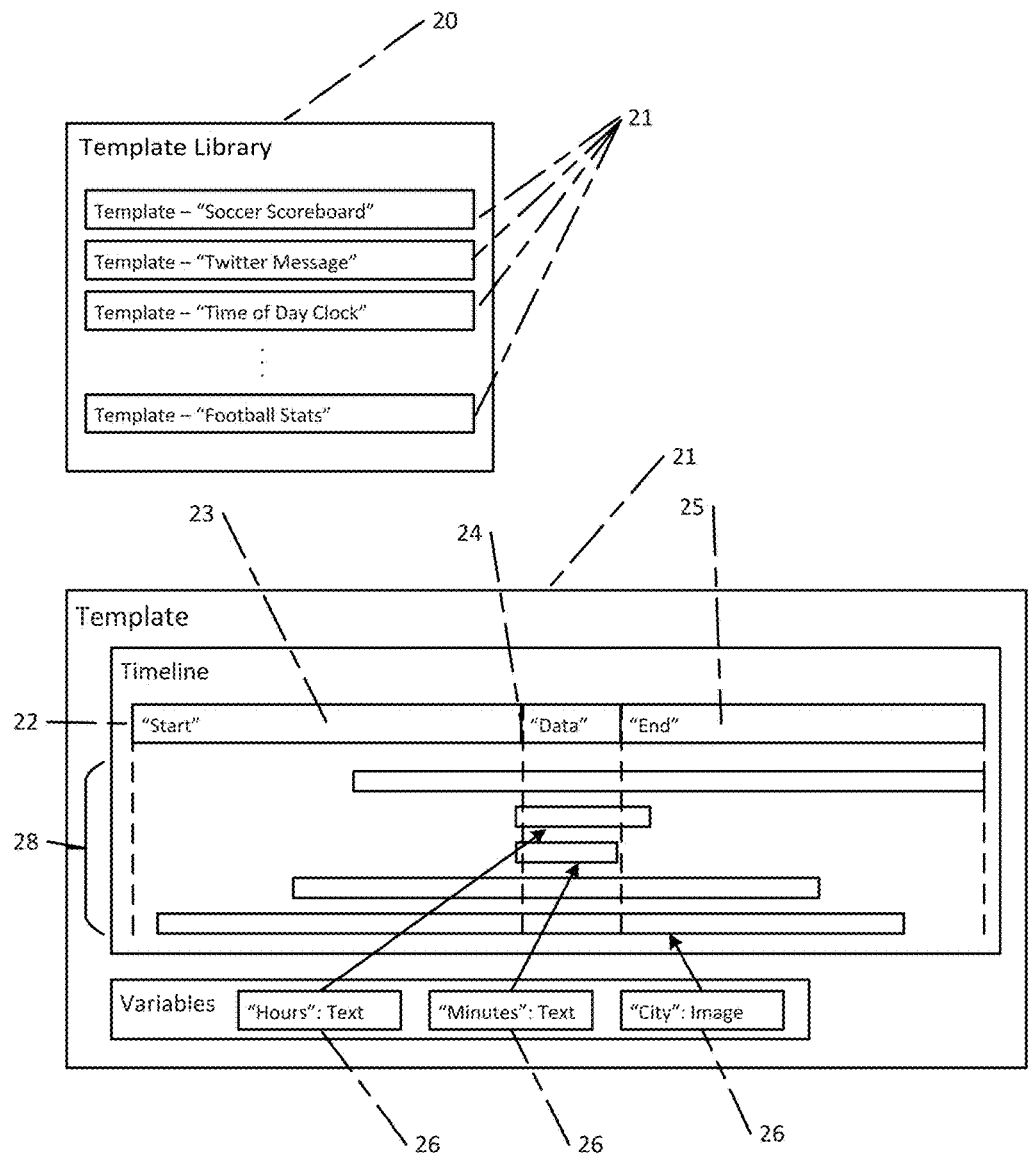
FIG. 4 is a block diagram illustrating a sub-component of the present invention, including the Template Library and components of Templates within it.

In FIG. 4, the Template Library 20 may include and store a plurality of templates 21 having a collection of prebuilt title sequences, each with fields for images, text, numbers, and more, that can be filled in with incoming data.

The Template Library 20 is optional to the intelligent visualization software engine 199.

Each Template 21 is the design version of a title animation that has one or more empty elements i.e., text, image, etc. so that they can be filled in at the time of use.

Each Template 21 is broken into regions that represent a section of time during the playback. These are called Segments 22. Segments can include but are not limited to three types:

Start 23: The segment at the very beginning of the Title that animates in.

Data 24: The segment of the title that displays data. Often this is just one frame, for example a scoreboard showing current score. Other times, it is a sequence of multiple frames, for example animated news feed scrolling through. Sometimes, it is the entire Title.

End 25: The last segment of the title that takes the title back off screen.

A Variable 26 is an empty field defined in each Template 21. Each Variable 26 field is identified with a unique Name. Variable types include text, numbers, images, colors, and more. Each Template 21 lists the variables that it supports.

A few Variables, including Duration, Size, and Position, are predefined and are used to manipulate the Template during usage, but are not built into the Template 21 itself. These are called Implicit Variables. (For example, Duration sets how long the title should play for and Size specifies how large or small to scale it when rendered.) All others are created by the Template author at the time of design and are driven by the specific visualization objectives of the Template 21.

The Template Library 20 stores and holds an organized suite of Templates 21 in one place, so the user can find and choose Templates 21 easily.

In another implementation of the present invention, the Template Library 20 may store, downloadable templates, shared templates, templates purchased and already installed, as well as templates authored by the user. Moreover, the intelligent visualization software engine 199 may have access to multiple Template Libraries 20 which may be local to the computer, remotely accessed via a network or the Internet, accessed in any other conceivable way, or a combination thereof.

D. Service Handler

Figure 5:
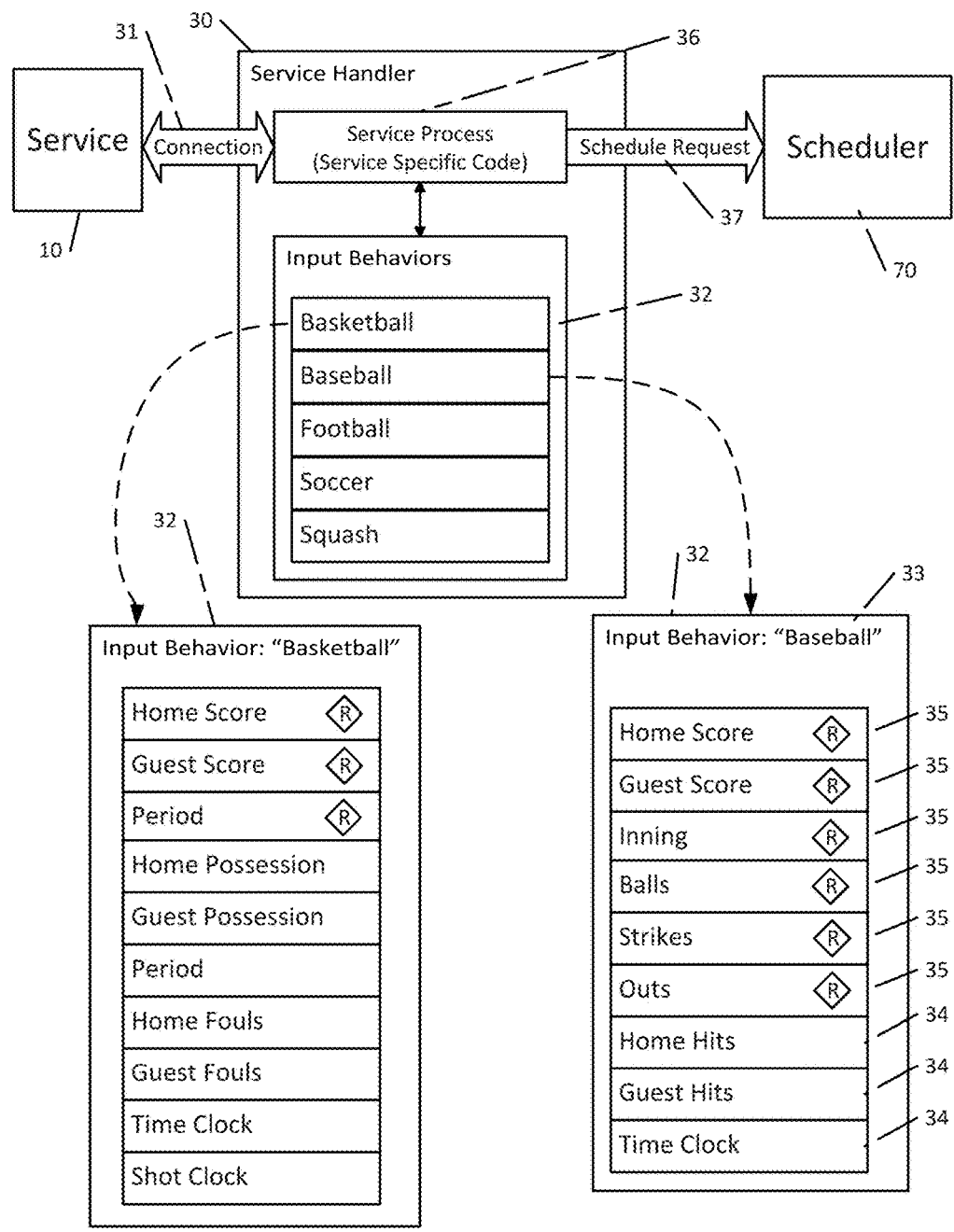
FIG. 5 is a block diagram illustrating a sub-component of the present invention, including the Service Handler and its internal organization.

Referring to FIG. 5, the Service Handler 30 is configured to manage the connection and receive a specific service at Service 10 and provide the necessary intelligence in the form of specialized software or algorithms to translate and transform a set of received data from the Service 10 into actions. Examples of these actions include commands to update a particular value on display (i.e., a sports time clock) or fill values into a template, render it, and then trigger playback (i.e., an incoming news alert) later described in detail herein below. The Service Handler 30 translates these actions into a predefined protocol that describes what data to display and rules for when and how to display it to the Scheduler 70. This predefined protocol, having a constant API, provides a standardized format or common language that is used by the visualization software engine 199. The benefit of having the predefined protocol to the software engine 199 is to eliminate any need for custom-specific protocols from the different data sources generated by the Service 10.

In practice, every Service 10 received by the intelligent visualization software engine 199 includes a unique Service Handler 30, designed to communicate with it via a protocol 11 that is associated with Service 10. A Connection 31 coupling the Service 10 to the Service Handler 30 is the part of the Service Handler 30 that decodes the protocol necessary to communicate with the Service 10 and manages all communication with it.

An Input Behavior 32 represents a particular visualization objective that can be achieved with data from a specific Service 10. The Service Handler 30 may provide one or more individual Input Behaviors 32, representing different ways to look at the data coming from the Service 10. Each Input Behavior 32 includes a Name 33 and list of required Template Variables 35. For example, an Input Behavior for a time service might be named "Time of Day" and require variables for "Hours" and "Minutes". The Input Behavior 32 also lists variables that it provides, but that are not required. In this example, they might be "Seconds" and "AM/PM".

Each Input Behavior 32 defines a Variables 34 that it supports, by name. In addition, for each Variable 34, it defines whether the Variable 34 is a part of the required Template Variables 35 to be represented in the destination Template 21.

Each Service Handler 30 is uniquely written with an understanding of how to translate the data 12 associated with each Service 10 into the common language of Variables and Actions. A Service Process 36 having a Service Specific Code parses the incoming data 12 and determines when to invoke the Scheduler 70 with the data 12, which it presents in the form of Variables 34. In addition, the Service Process 36 instructs the Scheduler 70 what kind of Action to follow, as well as what unique Queue to sequence it in. Each Action, is a playback instruction sent to the Scheduler 70, indicating what actions or instructions to take. For example, Actions may include instructions to play the title from the start, update an already displayed title, and every conceivable operation that could be invoked in the drawing and playback of Titles to represent the incoming data.

Queues are used to prioritize and manage the rendering and playback of Titles. Each Queue holds a series of Title actions that must be played in sequence, ensuring that nothing can collide. However, each Queue runs independently, allowing asynchronous, simultaneous playback between the Titles in each Queue.

The Service Process 36 manages the Connection 31 with the Service 10, translates the incoming data 12 into the predefined protocol or standardized format, and then initiates a graphics visualization action via a Schedule Request 37 that is received by the Scheduler 70. Each Service Handler 30 is uniquely constructed to manage the communication with a specific Service 10. Since there is a nearly infinite range of Services, then so too, there is a nearly infinite range of Service Handlers.

But, regardless of the protocol used to communicate with the Service, each Service Handler converts the data into the format and protocol defined by this system, for consumption by the titles in the Play List 40 described herein below.

E. Play List

Figure 6:
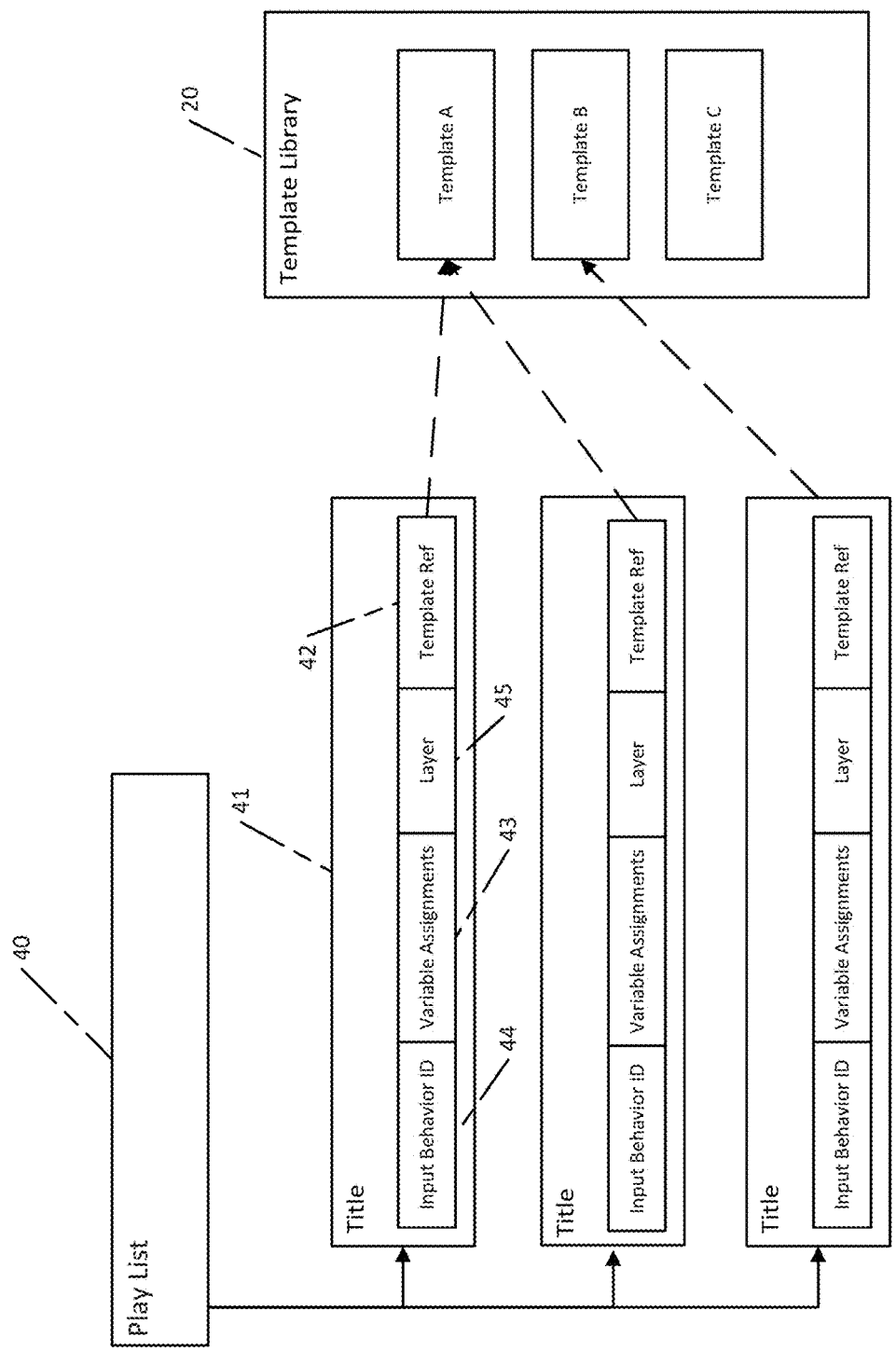
FIG. 6 is a block diagram illustrating a sub-component of the present invention, including an organization of the Play List and Titles within it.

FIG. 6 illustrates the Play List 40 and components thereof of the intelligent visualization software engine 199. The Play List 40 is a set of Titles 41 that are configured and ready to play. The Play List 40 can optionally be loaded and saved from file or other storage medium.

The Play List 40 is a set of Titles 41 that are configured and ready to play.

Each Title 41 is selected by the user from the Template Library, and can be customized in the Editor 90.

Each Title 41 is a unique item in the Play List 40, composed of a Template Ref 42 from the Template Library 20, a series of variable assignments 43 for the Template Ref 42, and one or possibly more Input Behaviors 44 that drive playback of the Title 41. The series of variable assignments 43 are combined with the template retrieved from the Template Ref 42 to generate the definition and render the Title 41.

The Play List 40 can be told to layer titles that play simultaneously so that one is always over another. This ordering is set with the Layer 45 parameter.

The Play List 40 can be loaded and saved from file or any other storage medium.

F. Render Engine

Figure 7:
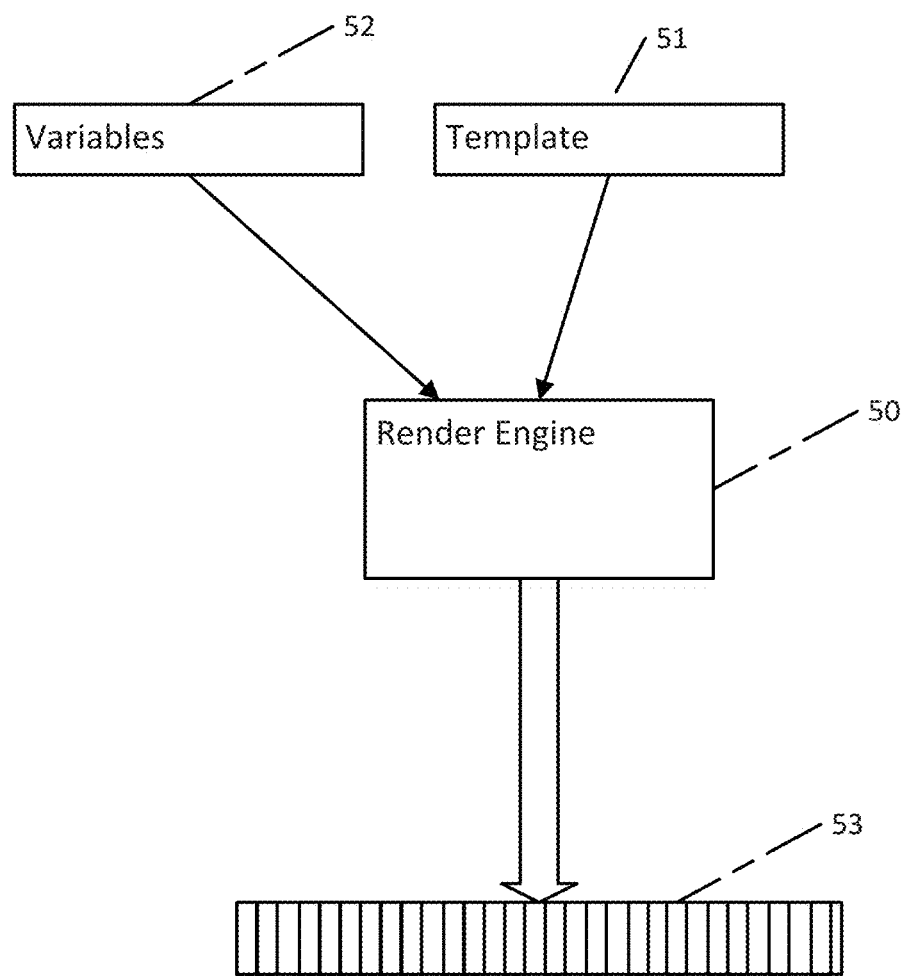
FIG. 7 is a block diagram illustrating a sub-component of the present invention, including the Render Engine, showing how it takes a template and variables and produces a video clip.

FIG. 7 illustrates Render Engine 50 of the intelligent visualization software engine 199. The Render Engine 50 takes the description of the title as defined by the Template 51 and Variables 52 assigned to it, and renders an image sequence, with optional sound.

The Render Engine 50 takes as input the Template 51 and optionally some Variables 52 and then uses the design, as defined by the Template 51, with the variations in text and other elements, as defined by the Variables 52, and generates a unique output video clip 53 composed of sequential frames of video and optional audio data.

The Render Engine can be any graphics based rendering technology that can generate a video motion sequence based on a Template that defines the components of the visual sequence and 0 or more variables that modify it.

G. Scheduler

Figure 8:
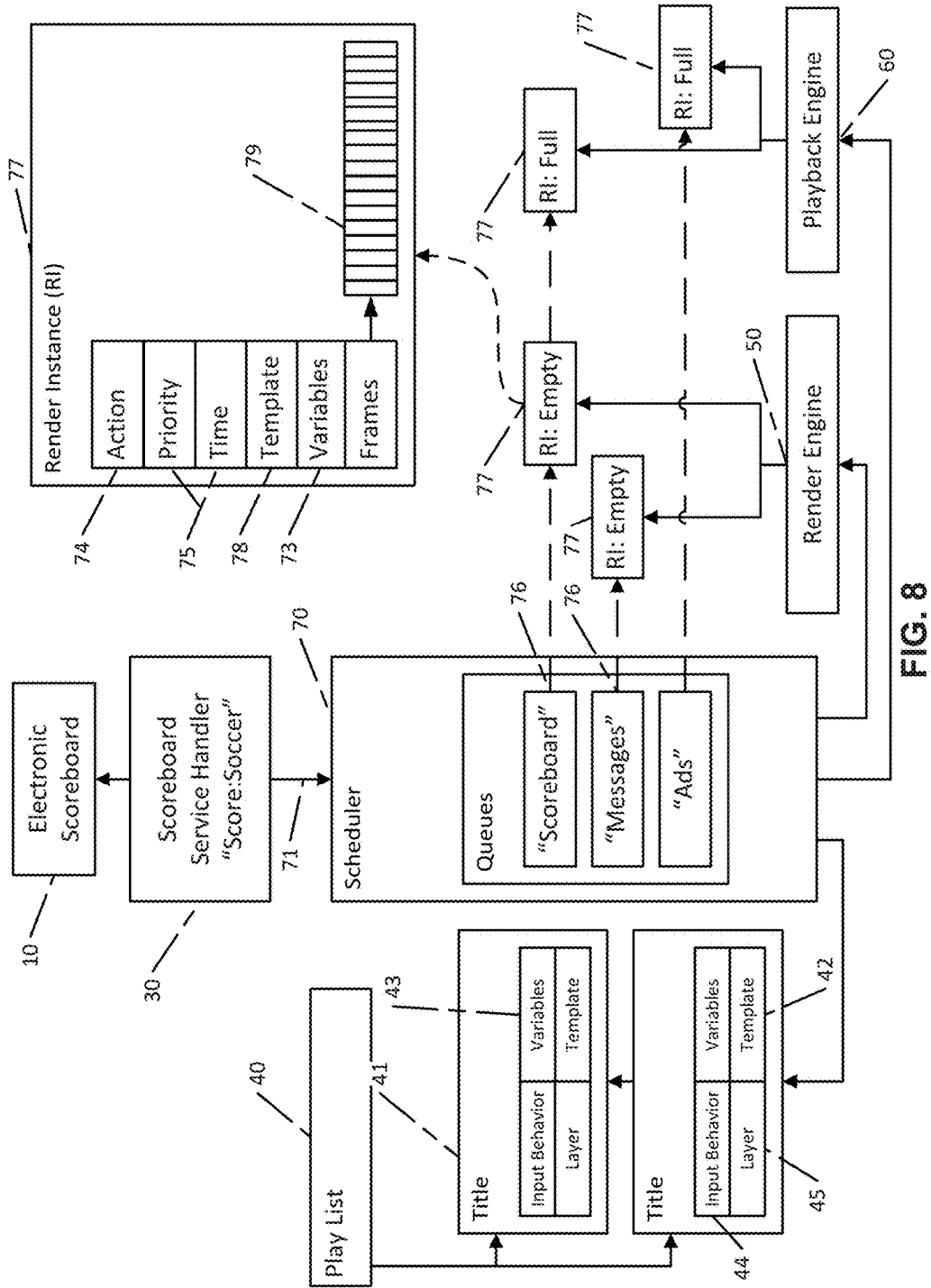
FIG. 8 is a block diagram illustrating a sub-component of the present invention, including the scheduler, showing how it receives a schedule request from the Service Handler and then manages the Play List, Render Engine, and Playback Engine.

FIG. 8 illustrates the Scheduler 70 and its operation and interaction with other sub-modules of the intelligent visualization software engine 199. The Scheduler 70 receives data and playback commands from the Service Handler 30 and uses these to feed Variables to Titles in the Play List 40, and schedule their rendering with the Render Engine 50, and then trigger playback of the rendered video to the Playback Engine 60 later described herein below.

The Scheduler 70 receives commands via the Schedule Request 37 from the Service Process 36 of FIG. 5, which can be an application program interface API call. The Schedule Request 37 includes:

Input Behavior 32—the ID of the Input behavior triggering the request, optionally, a specific Title in the Play list, the set of variables 73 to update, with their new values, A set of flags, indicating what actions 74 to take. These run the full range of every conceivable action, from "update the currently displayed Title with these values" to "Render a new Title with these values and transition to it from the currently playing Title."

The Queue, which defines the specific sequence of scheduled actions to run this in.

Priority and Timing 75—Optional position and time to specify when the action should take place visually either with a specific time or position in queue relative to other actions.

Queues 76 prioritize and manage the rendering and playback of Titles. Each Queue 76 holds a series of Render Instances 77 that are ordered in sequence, ensuring that they make it through the rendering and then playback processes in order and that no two Actions within one Queue can overlap. Each Render Instance 77 is triggered by the Schedule Request 70 and represents a section within the Title 41 as a rendered sequence of video frames and audio, along with the set of Variables 43 and start and end times used to define the time range in the Title Template 42 to render.

The Scheduler 70 uses the Render Instance 77 to manage the state of the Title 41 throughout this process. Each Render Instance 77 represents a section of the Title 41 as a rendered sequence of video frames and audio—Render Buffer 79. The Render Instance also carries all the information used to define it, including the Action 74, Time and Priority 75, Variables 73 and Template 78. The Schedule Request 37 usually comes from a Service Handler 30, but can also come from the Application or the Editor.

H. Template Finder

Figure 9:
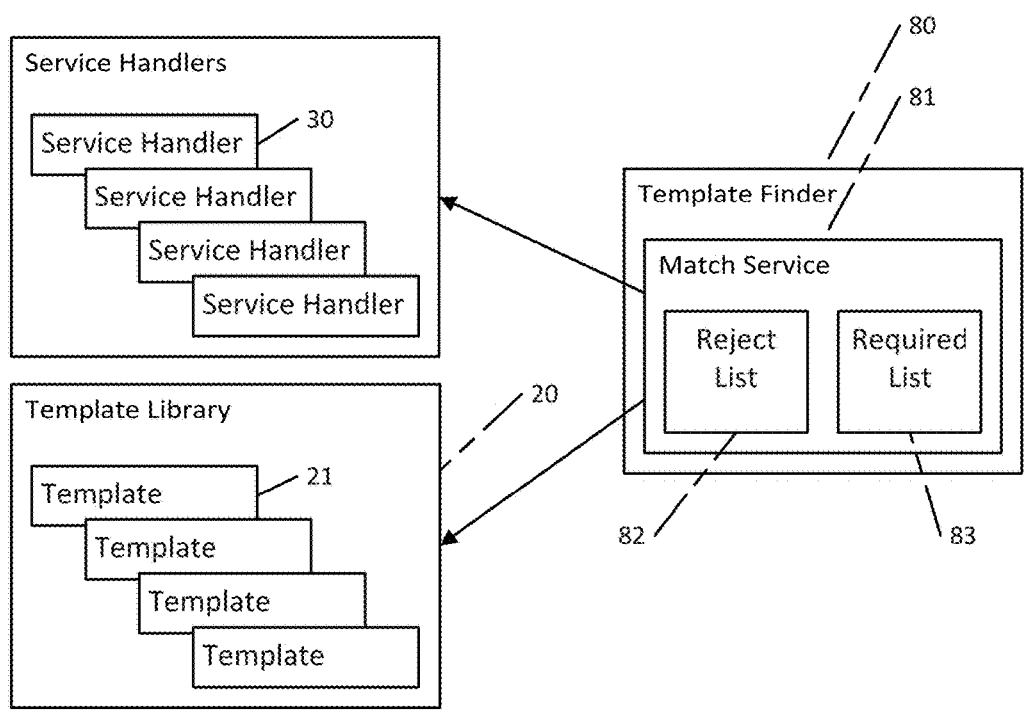
FIG. 9 is a block diagram illustrating a sub-component of the present invention, including the Template Finder, searching the Template library for Templates that match a given Service Handler's Input Behavior.

FIG. 9 illustrates the Template Finder 80 and its operation and interaction with other sub-modules contained within the intelligent visualization software engine 199. The Template Finder 80 identifies the best Template 21 choices for each Service Handler 30. This makes it much easier for the user to find Templates that work effectively with a specific Service Handler's Input Behavior 32. Conversely, the Template Finder 80 also finds the best Input Behavior 32 matches for a specific Template. The Template Finder 80 is optional to the intelligent visualization software engine 199 but very useful in many regards.

The Template Finder offers a Match service 81, which scans all Templates 21 in the Template Library 20 to find the subset of Titles that match a specific Input Behavior 32 from a given Service Handler 30. The algorithm for the Match service 81 is provided in FIG. 13 a later described herein below.

Conversely, the Match service 81 may also find the subset of Input Behaviors 32 that match a specific Template 21.

In the first embodiment, the Template Finder 80 uses variables in the Template 21 to find matches with variables in the Input Behavior 32. However, the Template Finder 80 can use any conceivable search mechanism, including embedded meta data, to identify Templates 21 that match specific Input Behaviors 32.

I. Editor

Figure 10:
FIG. 10 is a block diagram illustrating a sub-component of the present invention, including an Editor providing a user interface where the Title can be viewed and its variables edited.

FIG. 10 illustrates the Editor 90 of the intelligent visualization software engine 199. The Editor 90 provides a quick way to customize the Title 41 by changing the variables that control it. The Editor 90 also lets the user choose the Service Handler 30 that feeds data to the Title 41.

The Editor is completely optional to the intelligent visualization software engine 199.

The Editor 90 is a UI component that can be used to preview the rendered results in a preview window 92 and edit the Variables assigned to a Title 41 in a Title Editor 91.

J. Playback Engine

In the graphical data management system 200 shown in FIG. 2, the Playback Engine 60 is a component of the intelligent visualization software engine 199 and manages playback of the rendered titles via the Video Output Device 64. In addition, the Playback Engine 60 may create video frames 251 in a standard format (usually RGBA frames) and hands them to the Video Output Device 64, which translates the video frames 251 coming from the Playback Engine 60 into a specific mechanism for streaming. Thus, new Video Output Devices (252, 254, 256, 258) may be added without writing new code or adding new features to the Playback Engine 64. Examples include, but are not limited to, output via an HDMI port with green for the transparency, video and audio over IP via the NDI API, and sending out a series of PNG files to a file folder. The Video Output Device 64 may also display the titles over other media, such as web pages, still images, or any background.

Figure 11:
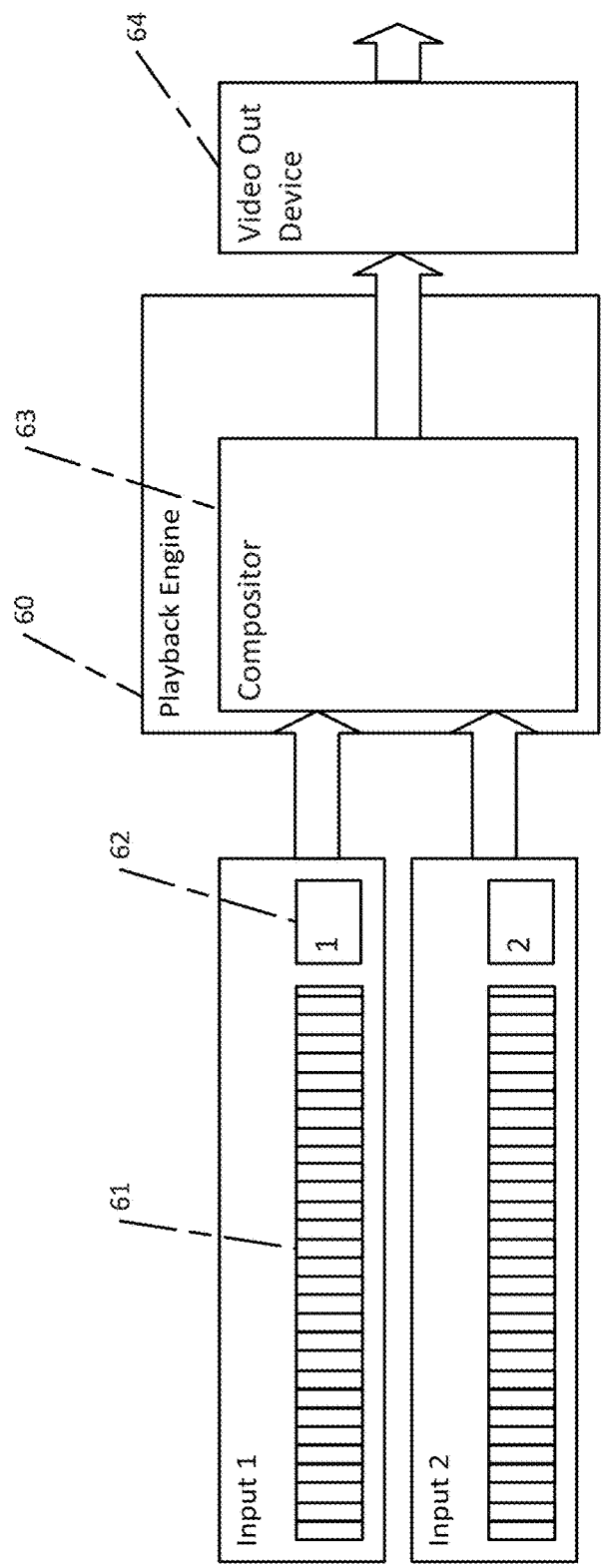
FIG. 11 is a block diagram illustrating a sub-component of the present invention, including the Playback Engine, showing its inputs and connection to an Input/Output I/O Device.

In one implementation as shown in FIG. 11, the Playback Engine 60 may receive one or more simultaneous Video Clips 61, which it mixes together in its internal Compositor 63 and sends to a specific Video Out Device 64. Layer 62 specifies the ordering for the compositing should more than one Video Clip plays simultaneously.

Any hardware or software device that can transmit or otherwise receive and send video, can be used by the Video Out Device 64 as described in the following section.

Figure 12:
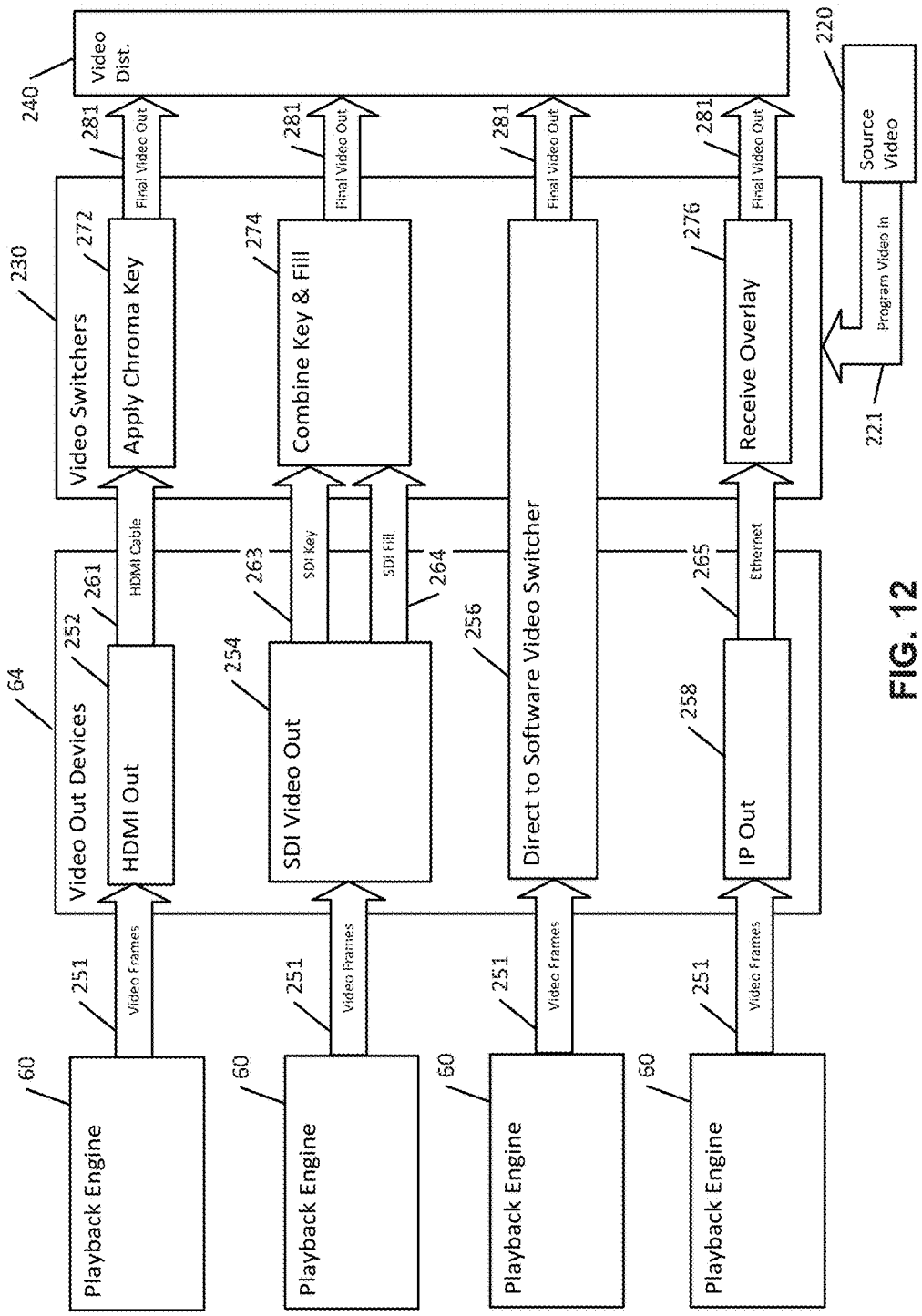
FIG. 12 is a block diagram illustrating a physical implementation and interaction of the Playback Engine, Video Out Device, and Video Switcher.

FIG. 12 illustrates a physical implementation of the output technology supported by the Video Output Device 64. In the graphical data management system 200 shown in FIG. 2, each Playback Engine 60 is a component of the intelligent visualization software engine 199 and manages playback of the rendered titles to a Video Output Device 64. Each Video Output Device may have a unique implementation for translating the video stream, including transparency, into a physical format to send over wire, cable, wireless, or other medium to the Video Switcher 230. Examples include, but are not limited to, an output via an HDMI port 252 with green for the transparency, SDI Video Out 254 for separating into Key and Fill, Direct-to-Software Video Switcher 256 for sending out a series of PNG files to a file folder or running software on the same computer or overlaying frames transferred in memory, for example, and a Video and Audio over IP Out 258 via the NDI API for sending frame packets with alpha IP. Although the Video Switcher 230 is intended primarily to overlay the title sequence over live video sources, an alternate implementation could display the titles over other media, such as web pages, still images, or any background.

In one implementation as shown in FIG. 11 and FIG. 12, each Playback Engine 60 may receive one or more simultaneous Video Clips 61, which it mixes together in its internal Compositor 63 and sends out via a specific Video Output Device 64 to the Video Switcher 230. In this example, Layer 62 may specify the ordering for the compositing should more than one Video Clip play simultaneously.

FIG. 12 demonstrates the use of hardware components associated with the Playback Engine 60 and how corresponding video frames 251 are transmitted to various Video Output Devices (252, 254, 258). In this example, corresponding video frames 251 are subsequently transmitted to corresponding Video Switchers (272, 274, 276) for further processing to render a Final Video Out 281 to the Video Distribution 240. In an alternative software implementation, the Playback Engine 60 may directly send rendered video frames 251 via the Direct-to-Software Video Switcher 256, bypassing the Video Switcher 230 and rendering the Final Video Out 281 to the Video Distribution 240.

In practice, the Final Video Out 281 from the Video Switcher 230 may be transmitted over various transmission mediums, including but not limited to wired cable, Internet, wireless systems, fiber-optics, satellite, or other digital or analog video distribution mechanism. These various transmission mediums carry the Final Video Out 281 to the Final Video Distribution 240 which may include, for example, display devices such as televisions, phones, computers, laptops, video monitors, video projectors, electronic billboards, digital televisions, mobile devices, smartphones, smart watches, tablets, web browsers, computer monitors, electronic display monitors, or any display device capable of showing a moving image and the like. The Final Video Distribution 240 may also include recording devices such as video recording devices to store and playback the video frames 251 from the Final Video Out 281.

Features, operation and use of each Video Out Devices (252, 254, 256, 258) are described herein below. Note, in the following examples, the Source Video 220 is applied as in input to the Video Switcher 230 at the Program Video In 221.

HDMI Out 252:

An HDMI cable 261 may only support a solid image without transparency. Thus, the HDMI Out 252 may substitutes a solid color (usually green) for transparency. Then, the Video Switcher 230 may be set to apply the Chroma Key 272 process to it, which replaces green with transparency. After applying the Chroma Key 272, the Video Switcher 230 may apply an overlay to composite over the Source Video 220.

SDI Video Out 254:

SDI Video Out 254 can be sent over two cables (263, 264)—one for the "key" 263 which is the transparency mask and one for "fill" 264 which is the actual color image. The SDI Video Out 254 device separates the frames into key and fill and sends them out via the two cables (263, 264). The Video Switcher 230 receives the two and then uses the key to control the overlay mixing of the fill image 274.

Direct to Software Switcher 256:

If the Video Switcher 230 is implemented in software and is running on the same machine, then the Video Frames 251 may simply be transformed into whatever format the switcher expects and sent to it in memory buffers and subsequently transmitted to the Final Video Out 281 for distribution.

IP Out 258:

Other protocols are available for sending video over an Ethernet connector 265. One such protocol, Network Device Interface (NDI), may transmit individual frames as RGBA data, including alpha transparency. The Video Switcher 230 may receive the video over IP and apply it directly as an overlay 276 to the Source Video 220.

K. Connection and Interaction of Main Components and Sub-Components of the Intelligent Visualization Software Engine 199.

Returning to FIG. 2, the Service Handler 30 communicates with the Service 10 and then sends data and commands to the Scheduler 70 which scans the Play List 40 for matching Titles 41 which it then schedules for Rendering in the Render Engine 50 and outputs the rendered results for playback by the Playback Engine 60.

The Template Finder 80, though optional, makes it much easier to choose Templates 21 from the Template library 20 that match a specific Service Handler's Input Behavior 32 and vice versa.

L. Operation of the Graphical Data Management System 200

To handle each unique Service 10, a unique Service Handler 30 is written that communicates with the Service 10. FIG. 3 shows a block diagram of a Service 10.

The Service Handler 30 communicates with the Service 10 using the protocol 11 defined by the Service 10, and then translates the specific Data 12 and Events 13 coming from the Service 10 into the standardized format.

FIG. 5 shows a block diagram of a Service Handler 30 and its connections and interaction with the Service 10 and Scheduler 70.

The Service Handler 30 may use whatever firmware or software mechanisms, specialized code, or algorithms it needs to communicate in the protocol 11 of the Service 10. In practice, this specialized code, called the Service Process 36, isolates the unique characteristics and requirements of the Service 10 from the rest of the system 200. The Service Handler 30 may implement any programming language, software or firmware algorithms, etc., to accomplish the task of converting the information coming from the service into the language of the schedule manager, which is represented by the Schedule Request( ) call.

The Service Handler 30 can be implemented as plugin component via a Dynamic Link Library DLL, script, or any program extension mechanism, allowing any number of Service Handlers 30 to be written and added to the system 200.

The Service Process 36 manages the Connection 31 with the Service 10, translates the incoming data into standardized data, and then initiates a graphics visualization action via a Schedule Request 37.

The standardized data itself takes the form of Variables. A Variable 34 is a named parameter for display that is created by the Service Handler 30 to package data coming from the Service 10. The Variable 34 definition itself is intended to be used consistently across all Service Handlers 30 to ensure a consistent language for the data. For example, the temperature value coming from a weather Service might be given the Variable name "Temperature_Celcius" by its Service Handler 30. Following this naming convention, a different Service Handler 30 that reads the outside temperature from a Bluetooth Temperature Sensor, would use the same Variable name, "Temperature_Celcius".

Variables 34 can take a number of forms. Typically, they are numbers and text. But, Variables 34 can also come in the form of images, colors, and even video clips. For example, a Service 10 that reads from a social media feed might download images as well as text. Because the variable itself is typically a text field, an image is then referenced by its file path. So, the image is downloaded from the Service 10, stored locally on the hard drive, and then its full path is passed as a Variable 34.

Typically, there is a set of one or more Variables 34 used to communicate for a particular purpose. For example, a sports scoreboard might have Variables for "Home Score", "Visitor Score", "Game Clock" and "Quarter" that regularly update over time. The video representation of this stays fixed in the display and updates when these values change.

The sports scoreboard Service Handler 30 might also have an option to trigger an animation whenever there is a touchdown or goal. This might have two Variables, "Team Name" and "Score" and automatically fly on to the screen, pause, then fly off.

The same Service Handler 30 might also have an option where the Service Handler 30 captures Tweets from fans and displays those. But, it needs to be curated for offensive language by the operator before playing.

These three examples demonstrate the need for one Service Handler 30 to be able to exhibit multiple different kinds of behavior, each using different subsets of data and events from the Service 10, and packaging it up in different ways. To support this, the Schedule Handler 30 manages each purpose as an Input Behavior 32.

Each Service Handler 30 supports one or more Input Behaviors 32.

An Input Behavior 32 represents a particular visualization objective that can be achieved with data managed by the Service Handler 30. The Input Behavior 32 includes a name 33 and list of required Variables 35. For example, an Input Behavior 32 for a time service might be named "Time of Day" and require variables for "Hours" and "Minutes". The Input Behavior 32 also lists variables that it provides, but that are not required. In this example, they might be "Seconds" and "AM_PM".

The Service Process 36 organizes the incoming data and makes its own rules for when and how it invokes the Schedule Request 37 for each Input Behavior 32. The Schedule Request 37 includes an identifier indicating the Input Behavior 32, the set of Variables 34 required for that Input Behavior 32, and parameters indicating what kind of action to take.

Each Service Handler 30 also offers an API with the following methods:
  Enumerate the Input Behaviors 32 that it supports. For each Input Behavior 32, this reports:
    The Name of the Input Behavior 32.
    A set of Variables 34 that it requires, by name.
    A set of Variables 34 that it supports, by name.
  Initialize the Service 10.
  Setup opens its own UI so the user can set up whatever is necessary to configure the service to generate data. This might open a web page or window or do nothing at all—it is entirely determined by the Service Handler 30 implementation.
  Save_Setup fills a supplied buffer with all the service configuration data. As an example, this could be in XML format. The caller can then save the data with the rest of the project.
  Load_Setup reads a previously saved setup buffer and initializes the Service Handler 30 with it. Again, this could an XML string.
  Connect activates the service and starts generating data.
  Disconnect deactivates the service and stops generating data.

Although this is a preferred embodiment, the functionality provided by these API calls can be implemented in any way that enables communication between the caller and the Service Handler 30. And, these calls are additional enhancements, not required for purposes of the invention.

In FIG. 4, the Template 21 stored in the Template Library 20 is the design version of a Title 41 and has one or more elements ie text, image, etc. empty so that they can be filled in at the time of use.

A Variable 26 is an empty field in the Template 21. Each Variable 26 field is identified with a Name. Variables 26 include text, numbers, images, colors, and more. The Template Variable correlates directly with the Variable 26 from the Input Behavior 32. The intention of an Input Behavior Variable 32 is to fill the value of the corresponding Template Variable.

A few Variables, including Duration, Size, and Position, are built into every Template 21. These are called Implicit Variables. All other Variables 26 are defined by the Template 21 author when designing the Template 21.

Each Template 21 lists the variables that it supports. This can be exposed via an API call, parsing the file format, or any other software means.

The Template 21 can incorporate text and graphics sequences that evolve over time 28.

The Template's timeline 28 is segmented into different regions for playback, called Segments 22. Each Segment 22 is a time bounded region within the Template's timeline 28. There is no limit or requirement for Segments 22, but for this implementation, these three Segments 22 can be used:
  Start 23: The Segment 22 at the very beginning of the Title that animates in.
  Data 24: The Segment 22 of the title that displays data. Often this is just one frame, for example a scoreboard showing current score. Other times, it may be a sequence of video frames, for example an animated news feed scrolling through the display. Sometimes, it is the entire Title.
  End 25: The last Segment 22 of the title that takes the title back off screen.

Although Templates 21 can be stored individually in files, it is very useful to the user to have all commonly used Templates 21 available in one place to allow for quick searching and access. The Template Library 20 provides this functionality.

With a large number of Templates 21 and a wide range of Input Behaviors, each with different Variable requirements, it becomes very important that a user can quickly search the Library for Templates that work with a specific Input Behavior 32.

In FIG. 9, the Template Finder 80 offers a convenient way to identify Templates 21 in the Library 20 that are matches for a specific Input Behavior 32.

To match a Template to an Input Behavior 32, the Template Finder 80 requires satisfying two criteria:
  A. The Template 21 must provide a superset all of or more of the Variables that the Input Behavior 32 requires. This ensures that all critical Variables are represented by the Template.
  B. The Template 21 must not include Variables that are offered by other Input Behaviors 32, but not by the matching one. This is to avoid Templates that have Variables intended for specific use by specific Input Behaviors 32.

Figure 13:
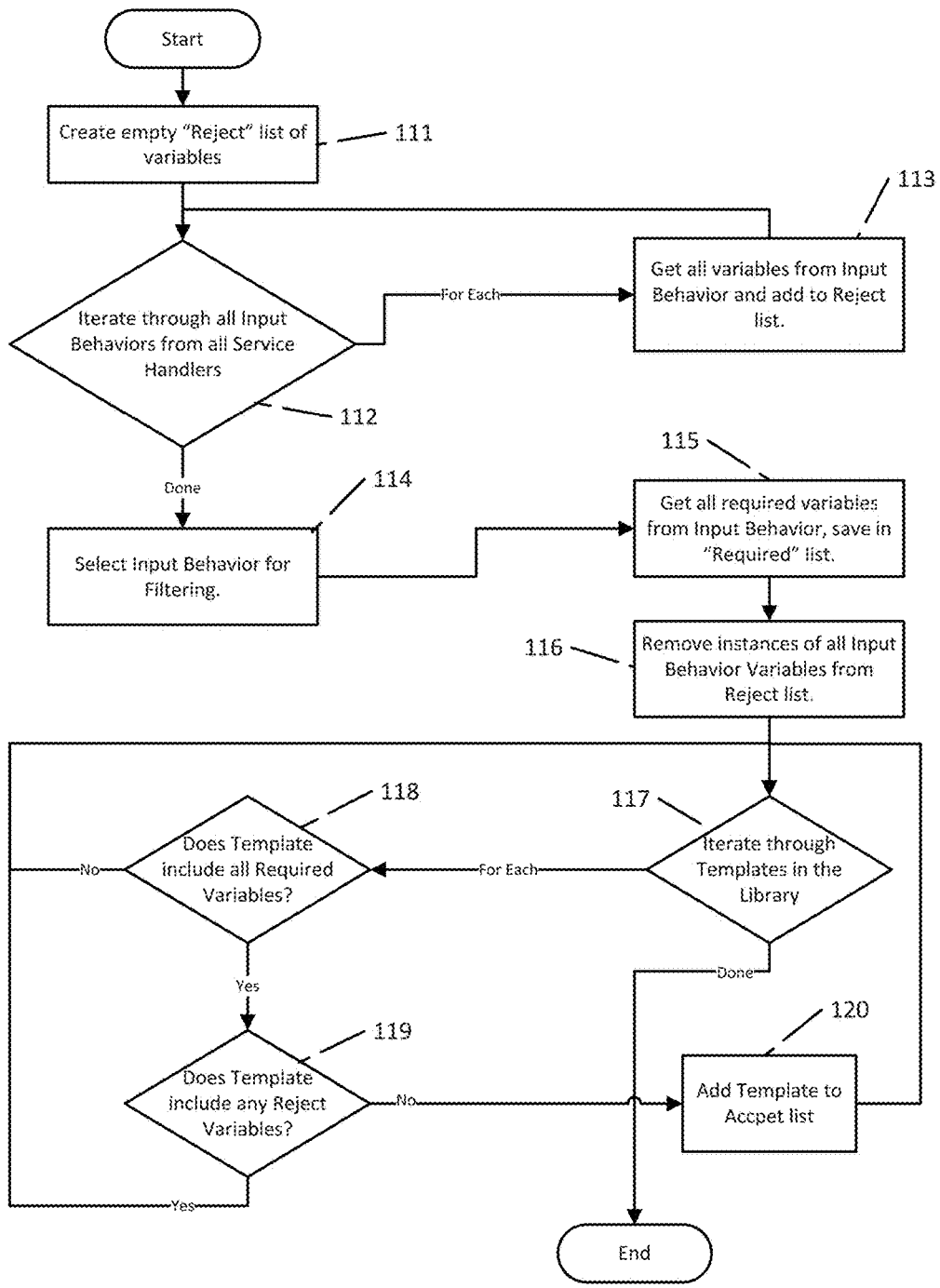
FIG. 13 is a flowchart illustrating a sub-operation of the present invention. This flowchart illustrates the mechanism for Template Matching.

In FIG. 13 illustrates a process flow chart of the Template Finder's Match Service 81. The process includes the following steps:
  1. Step 111, create a global set of all Variables offered by all Input Behaviors 32, the "Reject list" 82.
  2. Steps 112-114, subtract from the Reject list all of the Variables in the specific Input Behavior 32.
  3. Step 115, create a "Required list" 83 of all Variables required by the specific Input Behavior 32.
  4. Steps 116-120, for each Template in the Library:
    a. If the Template does not include all of the required Variables, discard it.
    b. It the Template includes any Variables from the Reject list 82, discard it.

In an alternate implementation, the Match Service 81 also offers a variation of this mechanism to find all Input Behaviors 32 that match a specific Template 21. This can be used to allow the user to choose a different Input Behavior 32 for an existing Template 21.
1. Create a global set of all Variables offered by all Input Behaviors 32, the "Reject" list 82.
2. For every Input Behavior 32:
   a. If the Input Behavior 32 has a required Variable not supported by the Template 21, discard it.
   b. If the Template 21 has a Variable that is in the Reject list 82, but not in the Input Behavior 32, discard the Input Behavior 32.

To set up Templates 21 for playback, the user constructs a Play List 40 as previously described herein above and in FIG. 6. The Play List 40 is a set of Titles 41 that are configured and ready to play.

In practice, each Title 41 is a unique item in the Play List, composed of a Template 42 from the Template Library 20, a series of Variables 43 to assign to the Template 21, one or possibly more Input Behaviors 44 references that drive playback of the Title 41, and a Layer 45.

The Play list 40 can specify how to layer Titles that play simultaneously so that one is always displayed over another. This ordering is set with the Layer 45 parameter.

If the user selects a Template 21 from the Library 20 that was searched for with a specific Input Behavior 44, the Input Behavior 44 is automatically assigned to the resulting Title 41.

Once a Title 41 is in the Play List 40, the user can optionally open it in the Editor 90 to customize it.

Referring again to FIG. 10, the Editor 90 lists all of the Template's Variables 91 for editing and preview 92 as follows:

Variables that match the Input Behavior's Variables can be hidden, read only, or editable. The preferred embodiment is read only so the user can see the values coming in from the Service 10, but is unable to change them.

Variables that are authored in the Template 21 but not in the Input Behavior are typically intended for user customization. These include names, colors, images, and more. The user makes changes to these to customize the look of the Title and can save them with the project the entire Play List 40.

Implicit Variables that are not authored but provided automatically for all Templates 21 include useful customizations, for example but not limited to size and position.

Note that Variable editing can be implemented with any UI approach, from text entry to drawing with the mouse.

The user can also use the Editor 90 to change the Input Behavior. In the preferred embodiment, the Input Behavior option displays a list of only Input Behaviors that match the current Template. This list of Input Behaviors is prepared by running the Match Service 81 from the Template Finder 80 to find Input Behaviors that match the Template 21.

Likewise, the Editor 90 can offer the choice of Template 21. Once again, it uses the Template Finder's Match Service 81 to find all Templates 21 that match the current Input Behavior.

To set up the system to perform graphics for a particular Service 10, the user might:
1. Choose an Input Behavior from the Service Handler 30.
2. Use the Template Finder 80 to search the Template Library 20 for all Templates 21 that match the required Service Handler 30.
3. Select a Template 21 from the Template Finder 80 results and drop it in the Play List 40, creating a Title 41 instance with the specific Input Behavior enabled.
4. View the Title 41 in the Editor 90 and customize the Variables not controlled by the Input Behavior.
5. Set up the Service Handler 30 to connect to the Service 10 and start sending data to the Title 41.

Next, the operation of the Render Engine 50 is presented and described herein below. Referring once again to FIG. 7, the Render Engine 50 is the graphics engine that converts a Title 41 description into a video sequence. Examples of such render engines may include graphical hardware boards, providing optimized mapping techniques to vastly increase the conversion and rendering of pixels into the final pixel values for output to a frame buffer for display.

The Render Engine 50 takes the description of the Title 41 as defined by the Template 51 and Variables 52 assigned to it, and renders an image sequence, with optional sound or audio data 53.

Template 51. The Render Engine 50 takes as an input a Template. 51

Variables 52. The Render Engine 50 also receives a set of Variables 52 to fill in all the Variable fields in the Template 51.

Output Video Clip 53. The Render Engine 50 creates a finished video clip with both image and sound.

The Playback Engine 60 manages playback of the rendered Titles 41 via a particular video output as shown in FIG. 8.

Each Video Output Device 64 has a unique implementation such as a communication methods and hardware components coupling the Video Output Device 64 to the intelligent visualization software engine 199. Examples include, but are not limited to, output via an HDMI port with green for the transparency, video and audio over IP via the NDI API, and sending out a series of PNG files to a file folder.

The following are sub elements of the Playback Engine 60 as shown in FIG. 11:

Video Clip 61: The Playback device 60 can receive one or more simultaneous Video Clips, which it mixes together and sends to the Device 60.

Layer 62: If more than one Video Clip plays simultaneously, the Layer 62 specifies the ordering for the compositing.

Compositor 63: The compositor 63 takes the multiple video clips and mixes them together.

Video Out Device 64 selection: This selects the Video Output Device to use to transmit the output to the Video Switchers 264.

Finally, the operation of the Scheduler 70 is presented and described herein below in detail. As shown in FIG. 8, the Scheduler 70 manages the preparation and playback of the Titles 41 in response to requests from the Service Handlers 30.

To orchestrate the desired behavior, the Scheduler 70 manages the Service Handlers 30, Play List 40, Render Engine 50, and Playback Engine 60.

The Scheduler 70 offers an API to "schedule" data for playback. This is usually called from a Service Handler 30 but can also be called from the Application directly. This Schedule Request 71 includes the Variables 73 to set and specifies the actions 74 to be executed.

The two sets of information provided in the call are the Variables 73 and the Action 74.

The Variables 73 indicate what to show. The Actions 74 indicate what to do.

The Actions 74 can be defined as any combination of available options in the underlying playback architecture. These can be options for when to show the title, how to use transitions, whether to require user participation, etc.

Example Actions 74 include "Update and show immediately", "Update and wait until time X to display", "Fly in the title, hold for 10 seconds, then fly out", or "Prepare the render and wait for the user to accept or reject." It is not necessary for the purposes of this invention to describe the implementation of each in detail. Rather, the invention is the mechanism used to communicate the full range of possible behaviors. For example, the command could be "Play the End segment of the title and then jump to updated Data segment." If the system is capable of being instructed to do a particular behavior, then it can be encoded in the Action 74.

Having said that, these are standard or built-in actions that are generally included in the intelligent visualization software engine 199:

Action_Update: Simply update the title with the new data. This is good for sports scoreboards.

Action_FlyThrough: Create a title that animates in, holds, then flies out. If more than one comes in, each should prepare and wait their turn in succession.

Action_CuratedFlyThrough: Create a title that waits in the Play List for the operator to review it, then either reject it or trigger its playback.

Action_PlayIn: Create a title, animate it in, then wait.

Action PlayOut: Animate the currently live title out.

These actions are all intended for a relatively unsophisticated playback architecture. If the architecture is more complex, then actions that reflect the increased complexity would be added.

The parameters passed via the Schedule Request 71 include:

Input Behavior 32: identifies the specific Input Behavior that triggered the call.

Title identifier 72: an optional parameter which selects a specific Title 41. This is primarily used by the UI to control a Title 41 directly.

Set of Variables 73 and their new values. Action 74 to take: The schedule request sends a set of values to place in variables; a set of variable names and values to place.

Queue 76: manages sequencing of the Action. Each named Queue plays one title at a time. Separate queues run in parallel.

Priority optional: sends Action to position in the Queue.

Time stamp 75: optional time indicator component for when to deliver the Title.

The Scheduler 70 manages the queuing, rendering, and playback of the Titles 41. It does this by accessing the Play List 40 to read the source definition of a title, then passing it to the Render Engine 50 to turn it into video, and then the Playback Engine 60 to play it.

The Scheduler 70 uses a Render Instance 77 to manage the state of a Title 41 throughout this process. Each Render Instance 77 represents a section of the Title 41 as a rendered sequence of video frames and audio and temporarily stored in a Render Buffer 79. The Render Instance 77 also carries all the information used to define it, including the Action 74, Time and Priority 75, Variables 73 and Template 78.

The Render Instance 77 exists in three phases:

Empty. The initial Render Instance 77 without any rendered frames.

Partial. The Render Instance 77 with some frames rendered, is currently in process of rendering.

Full. The Render Instance 77, with all its frames and ready to play.

The Render Instance 77 is placed in the Queue 76 named in the Schedule Request 71. The Scheduler 70 maintains a variable set of Queues 76, one for each unique Queue name.

Each Queue 76 manages the status of Render Instances 77 as they go from Empty to Full while being processed by the Render Engine 50 and then are scheduled for playback via the Playback API. Queues 76 are used to prioritize and manage the Render and Playback phases of Titles, as well as ensure that non-conflicting Titles can play simultaneously by putting them in different Queues 76.

Queues 76 only exist while they are being used. For example, two Schedule Requests 71 might both use the Queue 76 "Newsfeed" to play a scrolling news alert. The request creates the Queue 76 and places the Render Instance 77 for it there. The second request creates a second Render Instance 77 which ends up in the Queue 76 while it waits for the first Render Instance 77 to finish playing. Then the second Render Instance 77 plays. When it is finished, it is removed from the Queue 76. At that moment, the Queue 76 also goes away, because it is empty.

In response to the Schedule Request 71, the Scheduler first determines which Titles to address. If a Title ID is provided, it chooses that specific Title 41 from the Play List 40. If an Input Behavior is provided, it scans the Play List 40 and selects all Titles 41 that use the requested Input Behavior.

Next, it updates each Title 41 in the Play List 40 with the new Variables.

Then, it executes the Action 74. Depending on the Action 74, it either chooses a matching Render Instance 77 in the Queue 76 or creates a new one, then schedules it for Rendering.

When a render is completed, the Scheduler 70 changes the Render Instance 77 status to Full.

The Scheduler 70 also manages the play back of Titles 41 via the Playback API. The Scheduler 70 handles each Queue 76 separately, but following the same set of rules for playback. If nothing is playing, pull the highest priority Render Instance 77 in the Queue 76 that is Full and has a timestamp of now or earlier, and play it. Otherwise, do nothing. When a Render Instance 77 finishes playing, remove it from the Queue 76, discard it, and then pull the highest priority Render Instance 77 in the Queue 76 that is Full and has a timestamp of now or earlier, and play it.

Figure 14:
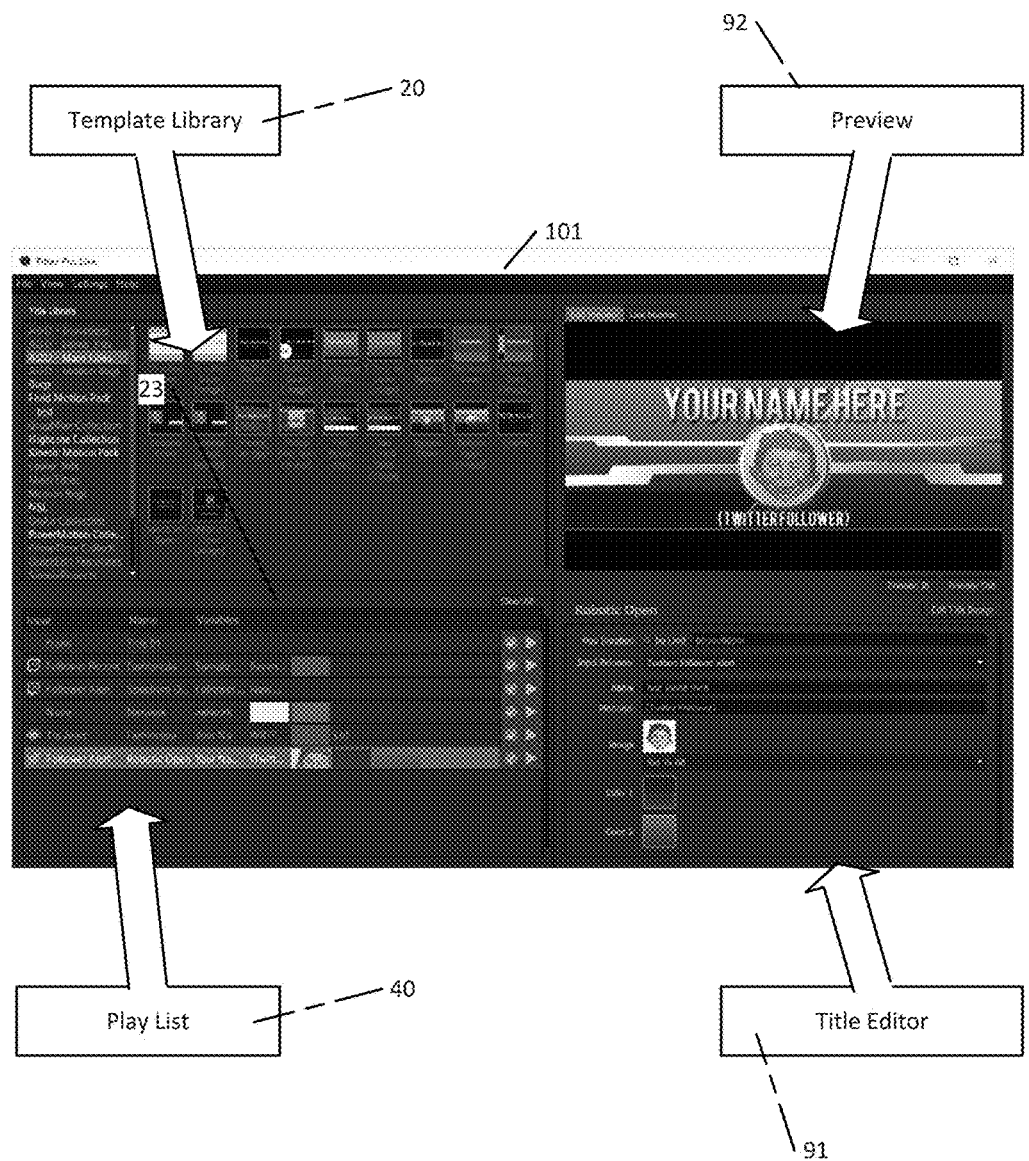
FIG. 14 is an embodiment of the present invention, the Application which is an optional configuration of the system.

FIG. 14 illustrates an optional configuration of the system. The software interface of the intelligent visualization software engine 199 which drives the computing system environment 100 may incorporate some or all of the above mentioned components together and optionally present a visual interface 101 to the user to manage it.

Figure 15:
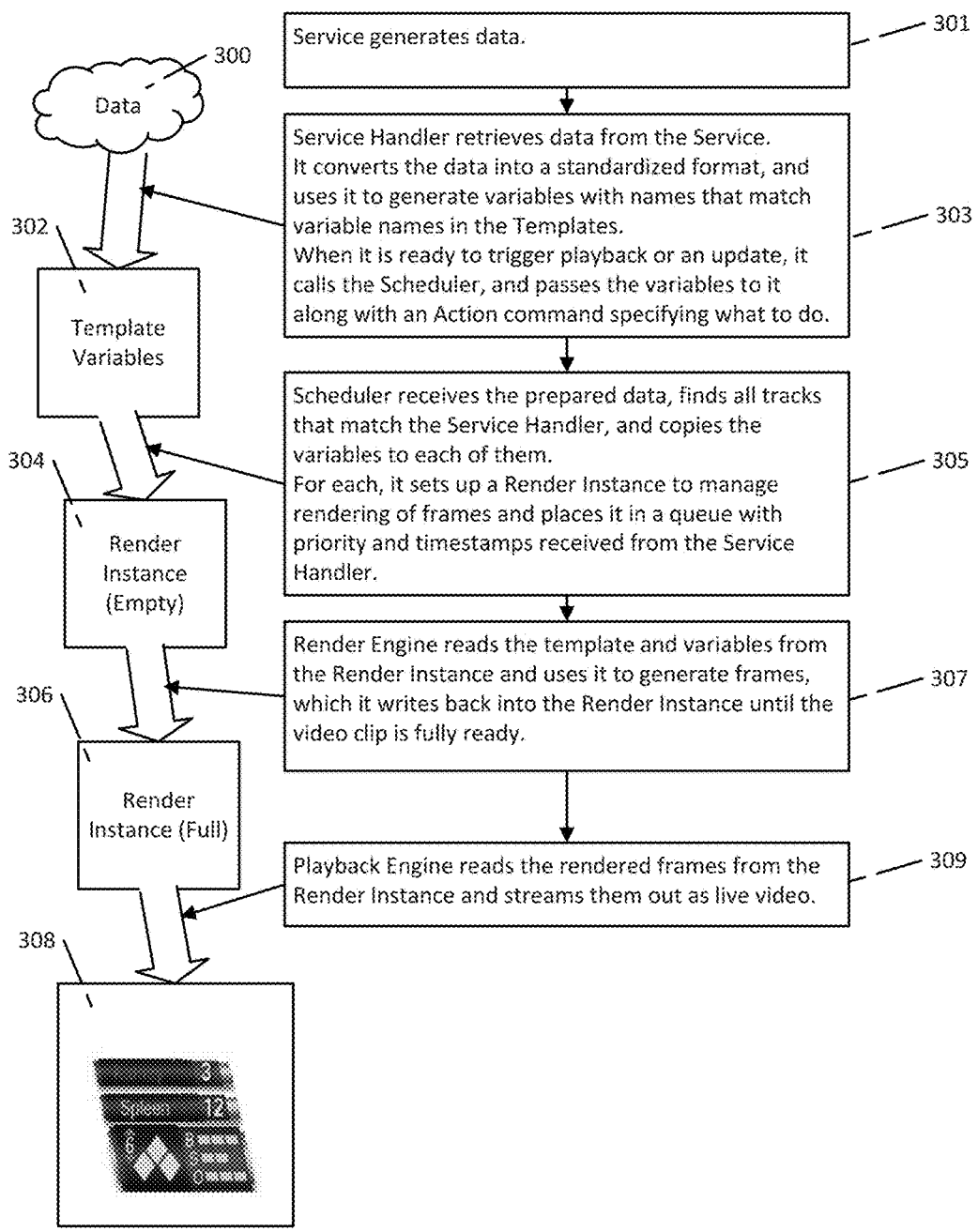
FIG. 15 is a flowchart illustrating the overall operation of the present invention, demonstrating the path data from the Service takes through the Service Handler, Scheduler, Render Engine, Playback Engine and then to appear as a visual output via the Video Output Device.

FIG. 15 illustrates a flowchart of the overall operation and data flow of the present invention. This flowchart illustrates data 300 from the Service 10 as it is processed through the Service Handler 30, Scheduler 70, Render Engine 50, Playback Engine 60, and then to appear as a visual output via the Video Out Device 64. Beginning at 301, Service 10 generates data 300. Next, at 303, Service Handler 30 retrieves data from the Service 10, where it converts the data into a standardized format, and uses it to generate variables 302 with names that match variable names in the Templates. When it is ready to trigger playback or an update, it calls the Scheduler 70, and passes the variables to it along with an Action command specifying what to do next. Following this step, at 305, the Scheduler 70 receives the prepared data, finds all tracks that match the Service Handler 30, and copies the variables to each of them. For each track, it sets up a Render Instance 304 to manage rendering of frames and places it in a queue with priority and timestamps received from the Service Handler 30. Next, at 307, the Render Engine 50 reads the template and variables from the Render Instance 304 and uses it to generate frames, which it writes back into the Render Instance 304 until the video clip is fully ready at 306. Finally, at 309, the Playback Engine 60 reads the rendered frames from the Render Instance Full 306 and streams them out as live video 308 via the Video Out Device 64.

Figure 16:
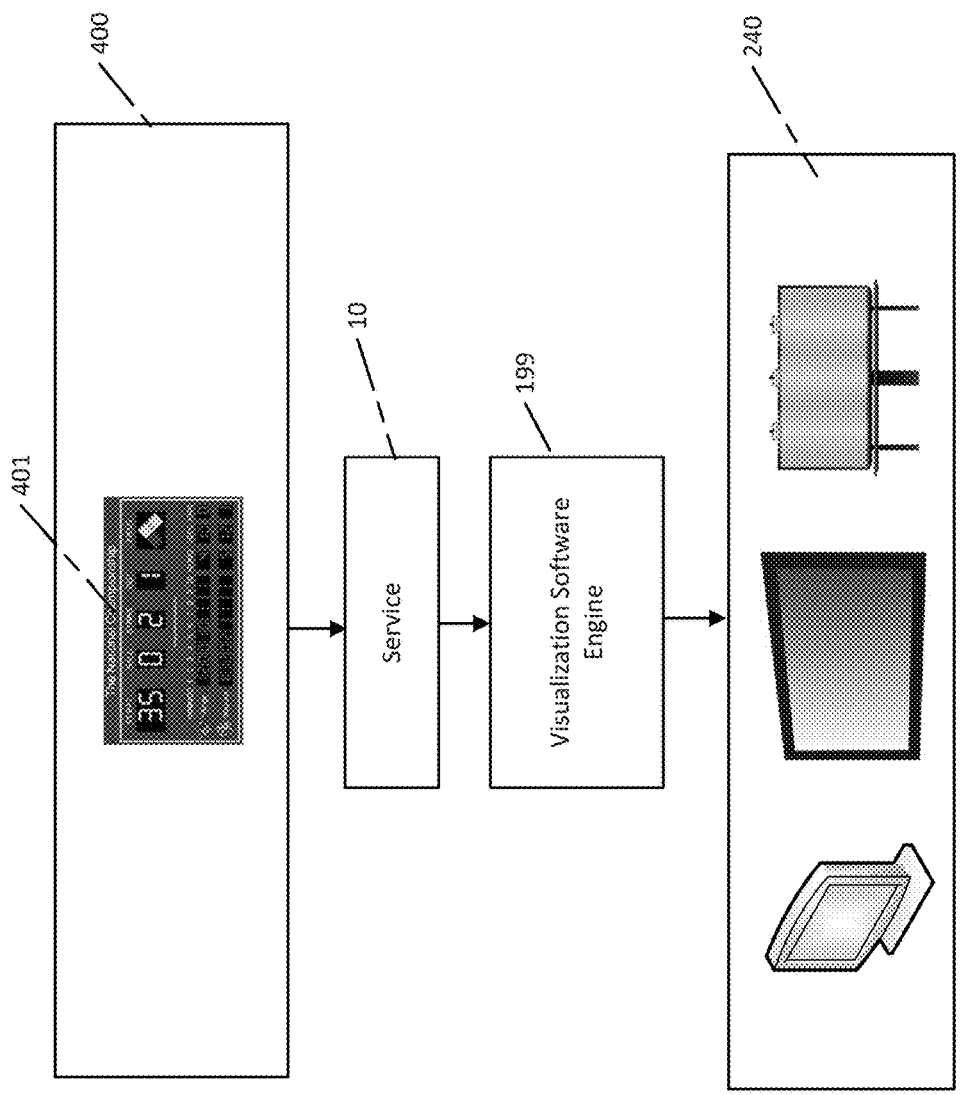
FIG. 16 illustrates an embodiment of an implementation of the present invention in a sporting environment.

FIG. 16 illustrates an exemplary application of the graphical data management system 200 in a sporting environment. In this example, a user of this system may stream a high school football game using a hardware peripheral that connects to a game scoreboard 401 to pull the live data, including a time clock, score, etc.

Referring to FIG. 8 and FIG. 16, physical components of the invention and use thereof are mapped in this high school football game scenario as follows:

1. The "Service" 10 may include a hardware connection between the intelligent visualization software engine 199 and the scoreboard 401.
2. A Service Handler 30 is provided that uniquely handles communication with this scoreboard 401 hardware.
3. The Service Handler 30 may provide several Input Behaviors. One of them, titled "Football Score" manages football scoring data. It defines a set of template variables that is supports, of which a few, including "Home Score" and "Guest Score" and "Down", are required.
4. The user may operate the software application, based on this system, generating graphics to overlay the video.
5. The user may start by going to the Template Library 20, and choose to filter it by "Football Score".
6. A Template Filter generated by the Match Service 81 lists just the Templates that match the variables optimally, and the user may choose one and drops it in the Play List 40.
7. The Title 41 in the Play List 40 may automatically get set to the Scoreboard: Football Score input Behavior.
8. User may customize additional variables in the Edit to have the School emblems and names for both sides and then connects to the service.
9. When the game is about to start, the user may click on an option to display the title 41, which in turn calls the Schedule Request 37 with the specific title and the action to animate it in.
10. Meanwhile, the service 10 may start sending data to the Service Handler 30 as the game starts.
11. With each new set of data which could be every second with the game clock the Service Handler 30 may send a new set of updated variables to the Schedule Request 37.
12. The Scheduler 70 may receive the data and an Action that commands it to Update. It may scan the Play List 40 and finds the Title 41 that matches the Input Behavior.
13. It may then generate a Render Instance 77 and may queue it to update the frames for the new variable values. The Render Instance 77 may include a pointer to the Template 42, and the Variables 43 to use. It also may specify the exact point in the Template Timeline, as defined by the "Data" segment.
14. The Render Instance 77 may go to the Render Engine 50, which may render the data, using the Template 42 and Variables 43, and insert it in the Render Instance 77.
15. The Scheduler 70 may then pass that to one or more Playback Engines 60, which may update with the new Data segment, replacing the image.

The graphical data management system 200 may be applied and configured to receive other external data sources 400 such as electronic measurement devices or other data collection systems having wireless capability for various application of rendering the external data into an animated and visual friendly output to the Final Video Distribution 240 which may include, for example, display devices such as televisions, phones, computers, laptops, video monitors, video projectors, electronic billboards, digital televisions, mobile devices, smartphones, smart watches, tablets, web browsers, computer monitors, electronic display monitors, or any display device capable of showing a moving image and the like.

All patents, patent applications, and other references cited herein are incorporated by reference in their entireties.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

I claim:

1. In a computer-based graphical data management system for matching a plurality of templates in a template library to find a set of titles that match a specific input behavior from a given service handler, a match service method comprising:
   generating a global set of variables, wherein the global set of variables is stored in a reject list;
   iterating through a plurality of input behaviors, wherein each input behavior includes one or more input behavior variables, wherein all of the input behavior variables are added to the reject list;
   selecting at least one specific input behavior variable from the plurality input behavior variables, wherein all specific input behavior variables are stored in a required list;
   removing a plurality of instances of all input behavior variables from the reject list;
      iterating through each template in the template library and determining all templates having one or more required variables defined in the required list and determining all templates having one or more rejected variables defined in the reject list; and
   adding all templates having one or more required variables defined in the required list to an acceptance list, wherein the all templates having one or more required variables defined in the required list excludes any rejected variables.

2. The match service method of claim 1, wherein the one or more required variables are discarded for a plurality of unsupported input behavior variables.

3. The match service method of claim 1, wherein each template is scanned, filtered, and identified by a meta data search mechanism.

4. The match service method of claim 1, wherein a matching title is scheduled by a scheduler for rendering a rendered instance by a render engine.

5. The match service method of claim 4, wherein the scheduler manages a play back of a selected title by a playback API.

6. The match service method of claim 4, wherein each rendered instance represents a section of the matching title as a rendered sequence of video and audio frames, wherein the rendered sequence of video and audio frames is temporarily stored in a render buffer.

7. The match service method of claim 6, wherein each rendered instance is placed in a queue named by a schedule request.

8. The match service method of claim 7, wherein the scheduler maintains a plurality of queues, wherein each queue manages a plurality of status information associated with the rendered instances as each rendered instance go from an empty state to a full state while being processed by the render engine, wherein each rendered instance is scheduled for the play back by the playback API.

9. The match service method of claim 8, wherein the queue prioritizes the play back of the matching title.

* * * * *